United States Patent [19]

Yamamoto

[11] Patent Number: 5,661,777
[45] Date of Patent: Aug. 26, 1997

[54] LOOP DETECTION SIGNAL ISSUING CIRCUIT IN SUBSCRIBER CIRCUIT HAVING ON-HOOK TRANSMISSION FACILITY

[75] Inventor: Yuzo Yamamoto, Kawasaki, Japan

[73] Assignee: Fujitsu Limited, Kanagawa, Japan

[21] Appl. No.: 526,952

[22] Filed: Sep. 12, 1995

[30] Foreign Application Priority Data

Nov. 30, 1994 [JP] Japan ................. 6-296264

[51] Int. Cl.$^6$ ................. H04M 1/24; H04M 3/08; H04M 3/22
[52] U.S. Cl. ................. 379/5; 379/1; 379/27; 379/34
[58] Field of Search ................. 379/5, 376, 377, 379/378, 1, 22, 34, 27, 28, 380, 382, 385

[56] References Cited

U.S. PATENT DOCUMENTS 5,289,537  2/1994  Yamamoto et al. .
5,446,786  8/1995  Shtulman ................. 379/377
5,570,418  10/1996  Wu et al. ................. 379/164

Primary Examiner—Curtis Kuntz
Assistant Examiner—Duc Nguyen
Attorney, Agent, or Firm—Helfgott & Karas, P.C.

[57] ABSTRACT

A circuit for issuing a loop detection signal in a subscriber circuit which sends information in the form of an AC signal to a subscriber while applying a bias voltage to the subscriber line by an on-hook transmission signal during idle intervals of a ringer output to the subscriber and, at the same time, varies the threshold value of loop detection at the loop detection circuit, wherein provision is made of a masking unit which controls whether to issue the loop detection signal SCN from the loop detection circuit without a mask or to mask that SCN according to the masking signal ms, an SCN supervisory unit which supervises the loop detection signal SCN and applies a masking signal ms masking the loop detection signal SCN appearing immediately after the restoration of the on-hook transmission signal as the erroneous detection signal to the masking unit; and a masking time setting unit which sets the time length of the masking signal ms and applies the reset signal rs for the masking signal to the SCN supervisory unit after an elapse of that time.

10 Claims, 19 Drawing Sheets

Fig. 3

| No. | SETTINGS | | | | MASKING TIME | |
|---|---|---|---|---|---|---|
| | D | C | B | A | | IF CK2 = 2mS |
| 1 | 0 | 0 | 0 | 0 | CK2 × 16 | 32mS |
| 2 | 0 | 0 | 0 | 1 | CK2 × 15 | 30mS |
| 3 | 0 | 0 | 1 | 0 | CK2 × 14 | 28mS |
| 4 | 0 | 0 | 1 | 1 | CK2 × 13 | 26mS |
| 5 | 0 | 1 | 0 | 0 | CK2 × 12 | 24mS |
| 6 | 0 | 1 | 0 | 1 | CK2 × 11 | 22mS |
| 7 | 0 | 1 | 1 | 0 | CK2 × 10 | 20mS |
| 8 | 0 | 1 | 1 | 1 | CK2 × 9 | 18mS |
| 9 | 1 | 0 | 0 | 0 | CK2 × 8 | 16mS |
| 10 | 1 | 0 | 0 | 1 | CK2 × 7 | 14mS |
| 11 | 1 | 0 | 1 | 0 | CK2 × 6 | 12mS |
| 12 | 1 | 0 | 1 | 1 | CK2 × 5 | 10mS |
| 13 | 1 | 1 | 0 | 0 | CK2 × 4 | 8mS |
| 14 | 1 | 1 | 0 | 1 | CK2 × 3 | 6mS |
| 15 | 1 | 1 | 1 | 0 | CK2 × 2 | 4mS |
| 16 | 1 | 1 | 1 | 1 | NO MASKING | |

Fig. 7

| No. | SETTINGS | | | | MASKING TIME | |
|---|---|---|---|---|---|---|
| | X | C | B | A | | IF CK2 = 2mS |
| 1 | 0 | 0 | 0 | 0 | CK2×8 | 16mS |
| 2 | 0 | 0 | 0 | 1 | CK2×7 | 14mS |
| 3 | 0 | 0 | 1 | 0 | CK2×6 | 12mS |
| 4 | 0 | 0 | 1 | 1 | CK2×5 | 10mS |
| 5 | 0 | 1 | 0 | 0 | CK2×4 | 8mS |
| 6 | 0 | 1 | 0 | 1 | CK2×3 | 6mS |
| 7 | 0 | 1 | 1 | 0 | CK2×2 | 4mS |
| 8 | 0 | 1 | 1 | 1 | CK2×1 | 2mS |
| 9 | 1 | — | — | — | NO MASKING | |

LOOP DETECTION SIGNAL ISSUING CIRCUIT IN SUBSCRIBER CIRCUIT HAVING ON-HOOK TRANSMISSION FACILITY

BACKGROUND OF THE INVENTION

1. Field of the Invention

The present invention relates to a circuit for issuing a loop detection signal in a subscriber circuit having an on-hook transmission facility.

Known in the art is a subscriber circuit of an exchange which employs "on-hook transmission", that is, issues information such as the telephone number of the calling subscriber in the form of a multifrequency signal or other AC signal during the idle intervals of the ringer. In a subscriber circuit in which such an "on-hook transmission" method is used, it becomes necessary to perform loop detection without error when the called subscriber responds to the ringer and picks the phone up off the hook.

2. Description of the Related Art

As will be explained in detail later by referring to the drawings, there is a possibility of an erroneous loop detection signal being produced. Such erroneous detection must be prevented. For this purpose, conventionally the following procedure was adopted: Namely, when the on-hook transmission signal became "1", a bias voltage was applied to the A-line and the B-line and the threshold value Vth of the loop detection was changed in the same way as the change of the potential of the A-line and the B-line due to the time constant of the battery feed circuit and subscriber line at this time. By this, erroneous detection was prevented.

However, according to such a conventional method, it is necessary to add a time-constant circuit comprising resistors and capacitors to the circuit for generating the threshold value Vth of the loop detection circuit and further to make that time-constant match the time-constant when the bias voltage is applied to the A-line and the B-line. As a result, there arose the problems that the number of parts was increased and the cost was increased due to the need for improvement of the precision of the parts.

SUMMARY OF THE INVENTION

Therefore, an object of the present invention is to provide a circuit for issuing a loop detection signal which prevents an erroneous loop detection operation without causing the above-described problems.

To attain the above object, there is provided a circuit for issuing a loop detection signal in a subscriber circuit which sends information in the form of an AC signal to a subscriber while applying a bias voltage to the subscriber line by an on-hook transmission signal during idle intervals of a ringer output to the subscriber and, at the same time, varies the threshold value for loop detection at the loop detection circuit, wherein provision is made of a masking unit which controls whether to issue the loop detection signal SCN from the loop detection circuit without a mask or to mask that SCN according to the masking signal ms, an SCN supervisory unit which supervises the loop detection signal SCN and applies a masking signal ms masking the loop detection signal SCN appearing immediately after the restoration of the on-hook transmission signal as the erroneous detection signal to the masking unit; and a masking time setting unit which sets the time length of the masking signal ms and applies a reset signal rs for the masking signal to the SCN supervisory unit after an elapse of that time.

BRIEF DESCRIPTION OF THE DRAWINGS

The above object and features of the present invention will be more apparent from the following description of the preferred embodiments with reference to the accompanying drawings, wherein:

FIG. 3 is an explanatory view of mask time setting in the first embodiment of the present invention;

FIG. 7 is an explanatory view of mask time setting in the second embodiment of the present invention;

DESCRIPTION OF THE PREFERRED EMBODIMENTS

Before describing the embodiments of the present invention, the related art and the disadvantages therein will be described with reference to the related figures.

Figure 15:
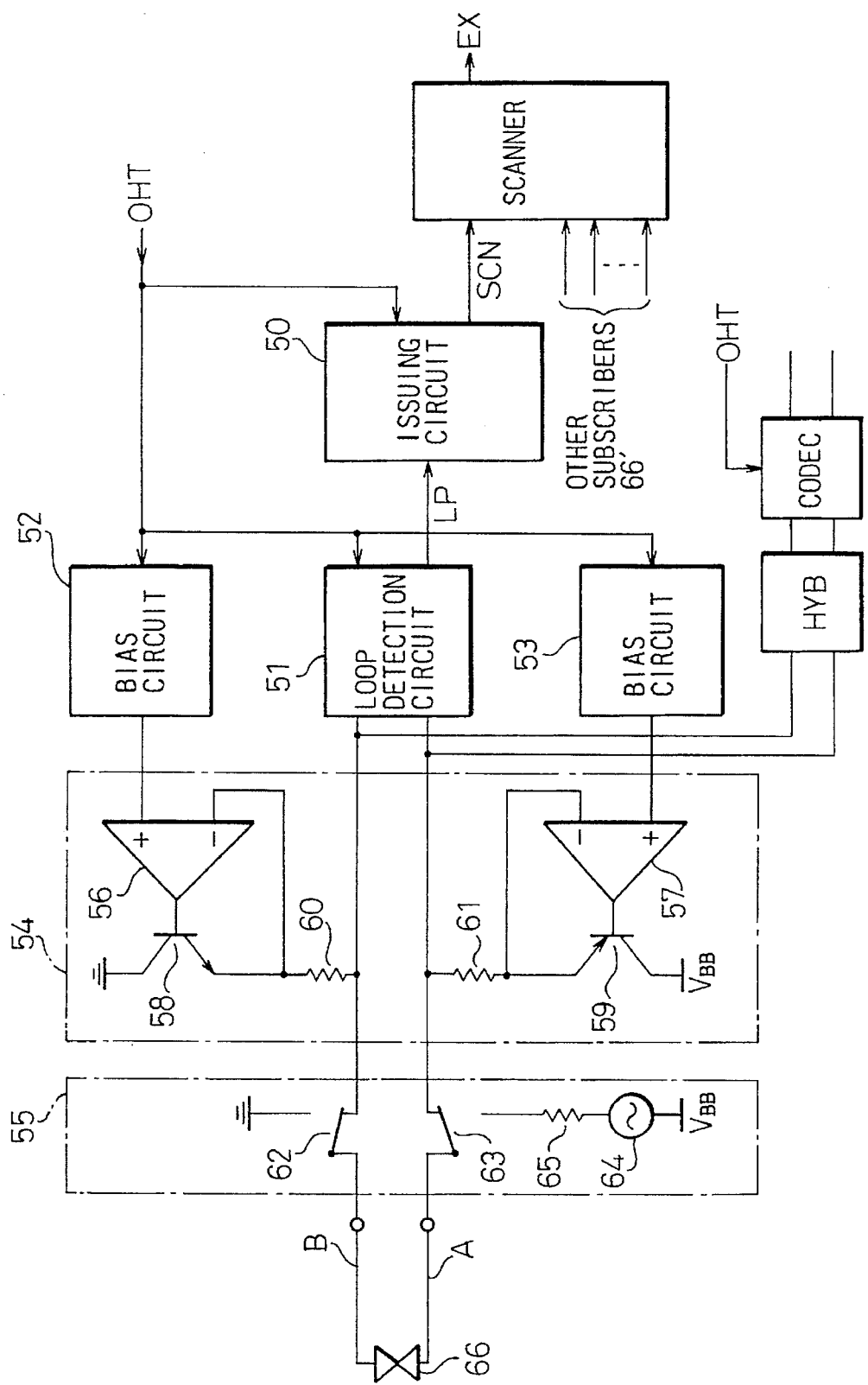
FIG. 15 is an explanatory view of a principal part of a subscriber circuit.

FIG. 15 is an explanatory view of the principal parts of a subscriber circuit, in which reference numeral 50 is an issuing circuit which issues a loop detection signal SCN in accordance with a scan from a scanner of an exchange (EX); 51 is a loop detection circuit which detects a loop formed by the subscriber 66 picking up the phone off the hook and sends a loop detection signal LP to the issuing circuit 50; 52 and 53 are bias circuits; 54 is a battery feed circuit; 55 is a ringer sending circuit; 56 and 57 are operational amplifiers; 58 and 59 are transistors; 60 and 61 are resistors; 62 and 63 are contact points of a relay; 64 is a ringer generator; 65 is a resistor; $V_{BB}$ is a battery voltage, for example, −48 V; and OHT is an on-hook transmission signal.

Electrical power is fed to an A-line (ring line) and a B-line (tip line) of the subscriber line via the transistors 58 and 59 of the battery feed circuit 54, a loop current caused by the subscriber 66 picking up the phone off the hook is detected by the loop detection circuit 51, and that loop detection signal LP is sent to the issuing circuit 50 and is sent to a central control unit (CCU) of the exchange EX via the scanner as the loop detection signal SCN by a scan of for example a 4 ms cycle from the scanner of the exchange EX. Also, when a call is received by the subscriber 66, the contact points 62 and 63 of the relay in the ringer sending circuit 55 are switched to the opposite side from the illustrated side, whereby a ringer is sent from the ringer generator 64 to the subscriber 66.

Figure 16:
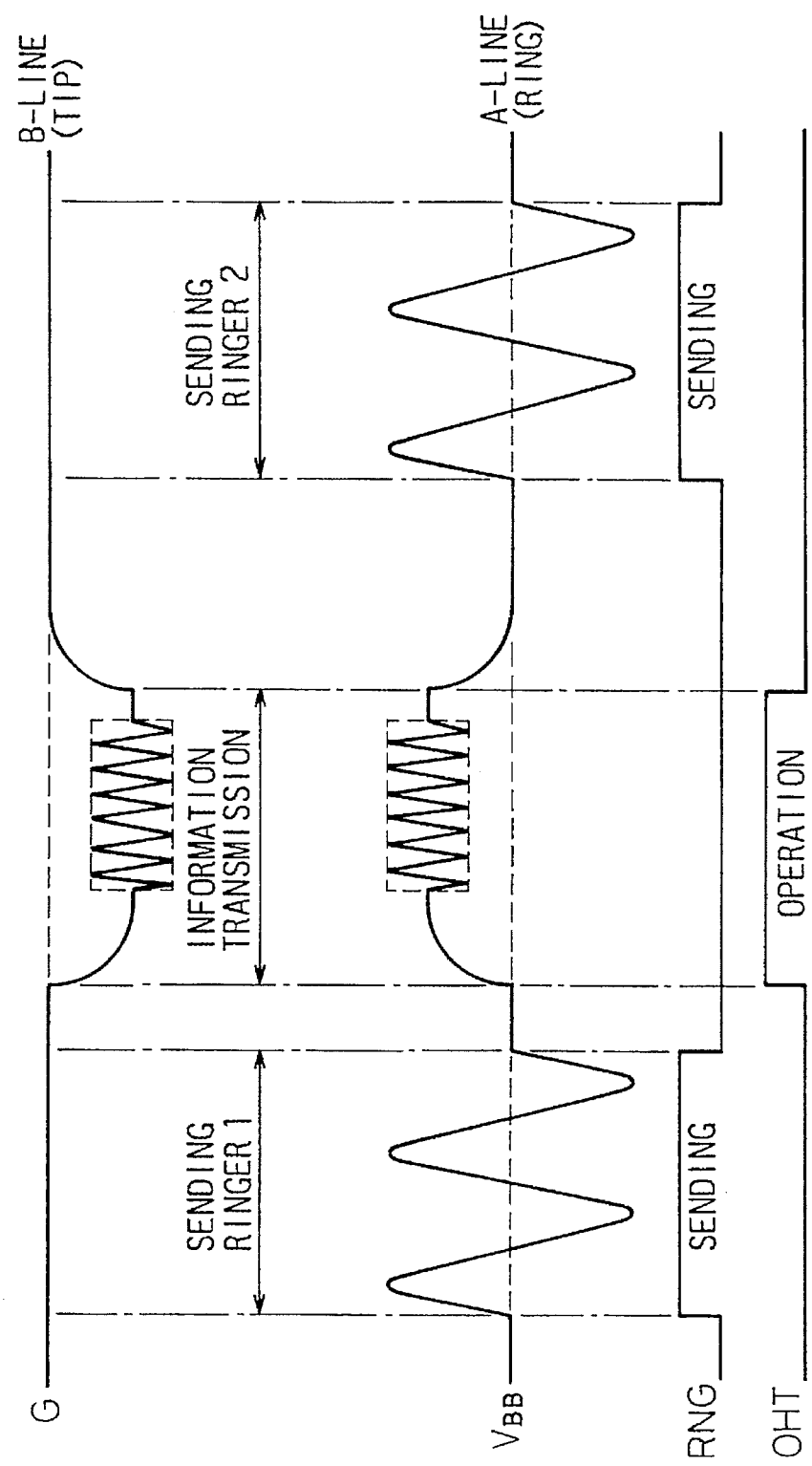
FIG. 16 is an explanatory view of the on-hook transmission method executed in the subscriber circuit.

FIG. 16 is an explanatory view of the on-hook transmission method executed in the subscriber circuit, in which G denotes a ground; $V_{BB}$, a battery voltage; RNG, a ringer sending signal; and OHT, an on-hook transmission signal. Here, the B-line of the subscriber line assumes the ground G, and the A-line assumes the battery voltage $V_{BB}$.

When a call is received by the subscriber 66 (refer to FIG. 15), if the ringer sending signal RNG indicates "1" ("sending"), during that sending period, the contact points 62 and 63 of the relay of the ringer sending circuit 55 are switched to the opposite side from the illustrated side, so that the ringer from the ringer generator 64 is sent to the subscriber 66. When the on-hook transmission signal OHT indicates "1" ("operation") between the sending of the first ringer 1 and the sending of the second ringer 2, a bias voltage to the battery voltage $B_{BB}$ side relative to the ground G is applied from the bias circuit 52 to the B-line, and a bias voltage to the ground G side relative to the battery voltage $V_{BB}$ is applied from the bias circuit 53 to the A-line. Then, for example, various types of information, for example, the telephone number of the calling subscriber, are issued via a codec and hybrid circuit (HYB) of FIG. 15 to the subscriber 66 in the form of an AC signal such as a multifrequency signal as indicated by the "information transmission" and are displayed on a display or the like of the subscriber 66.

Figure 17:
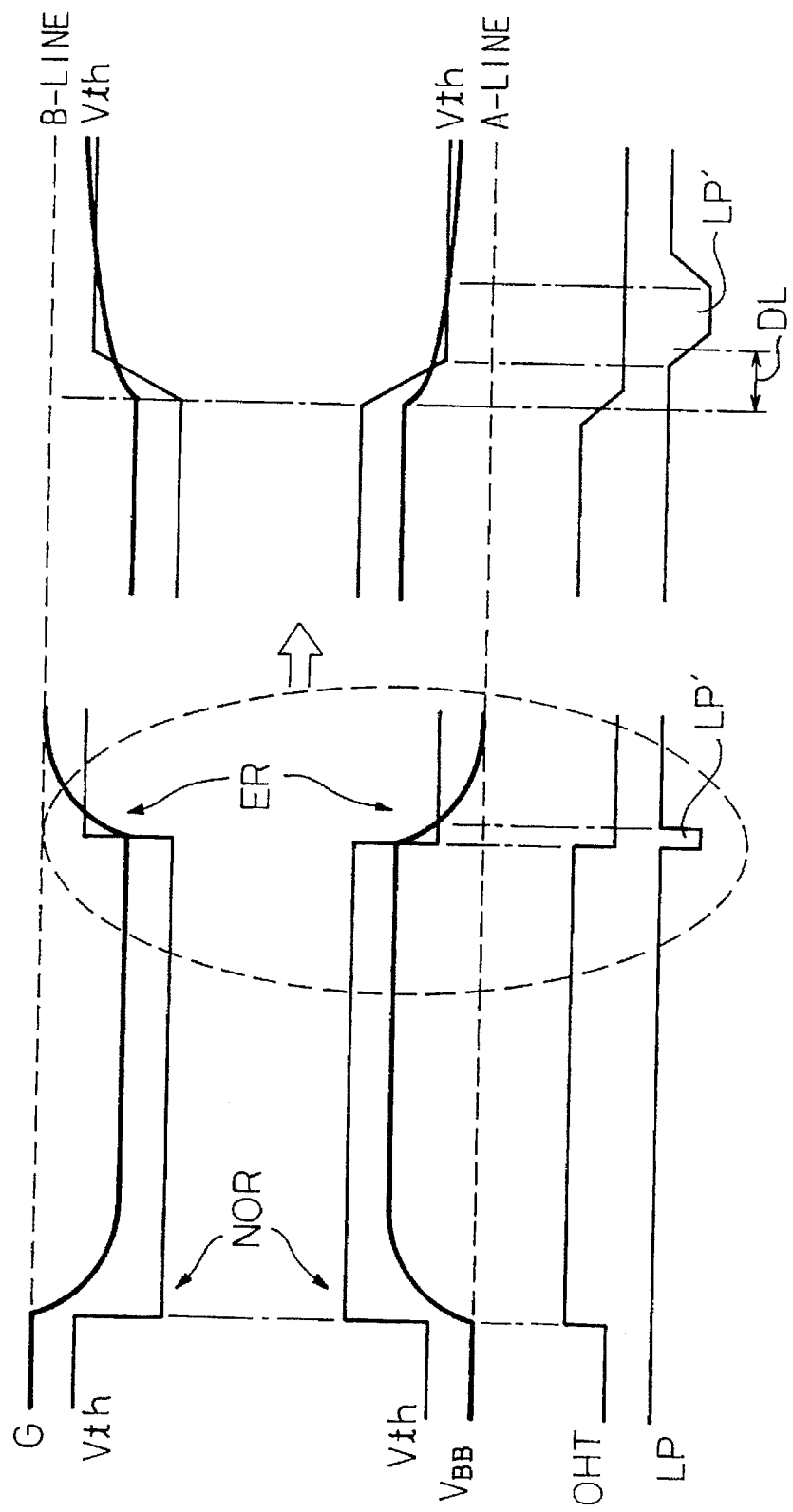
FIG. 17 is an explanatory view of a loop detection at the time of an on-hook transmission operation.

FIG. 17 is an explanatory view of the loop detection at the time of the on-hook transmission operation. When the on-hook transmission signal OHT becomes "1", as mentioned before, the bias voltage is applied to the B-line and the A-line from the bias circuits 52 and 53, respectively, but due to the time constant of the battery feed circuit 54 and the subscriber line, the potentials of the B-line and the A-line gradually change as indicated by the illustrated bold lines. Also, the threshold value Vth of the loop detection in the loop detection circuit 51 is changed along with the application of the bias voltage to the B-line and A-line as indicated by the thin lines.

When this threshold value Vth is changed in synchronization with the on-hook transmission signal OHT, the change of the threshold value Vth is fast at the time of rising and falling, while the change of the potentials of the B-line and A-line is delayed. Therefore, there is no problem at the time of the rising of the on-hook transmission signal OHT ("NOR" in the figure). However, at the time of falling, as indicated by "ER", the potentials of the B-line and A-line recover to the original ones after the threshold value Vth returns to the original value. For this reason, the loop detection signal LP' ("0") is output. This is an erroneous detection signal. The state where this erroneous detection signal LP' is obtained is shown enlarged on the right side. In actuality, the threshold value Vth also returns to the original value with a time delay (DL), and therefore the loop detection signal LP' of an erroneous detection is obtained after the delay time of DL from the falling of the on-hook transmission signal OHT. Such loop detection signal LP' of erroneous detection is issued as SCN from the issuing circuit 50 by the scan from the scanner, and therefore it is decided that the subscriber 66 has responded to the call by picking up the phone off the hook and then immediately placed the phone back on the hook.

Figure 18:
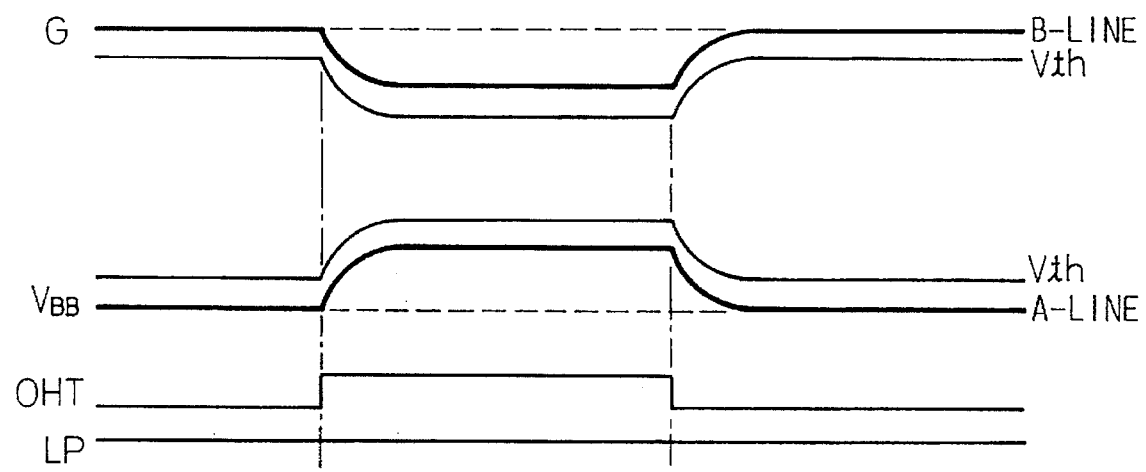
FIG. 18 is an explanatory view of the operation of a conventional example of an erroneous detection prevention means.

The method of FIG. 18 has been proposed for preventing such an erroneous detection. FIG. 18 is an explanatory view of the operation of a conventional example of an erroneous detection prevention means. When the on-hook transmission signal OHT becomes "1", the bias voltage is applied to both the A-line and the B-line. The case is shown where the time constant is given to the threshold value Vth to achieve the loop detection of the loop detection circuit 51 so that the threshold value Vth of the loop detection is changed in the same way as the change of the potentials of the A-line and B-line by the time constant of the battery feed circuit and subscriber line at that time. By this, there is no generation of a loop detection signal LP' of the erroneous detection.

Figure 19:
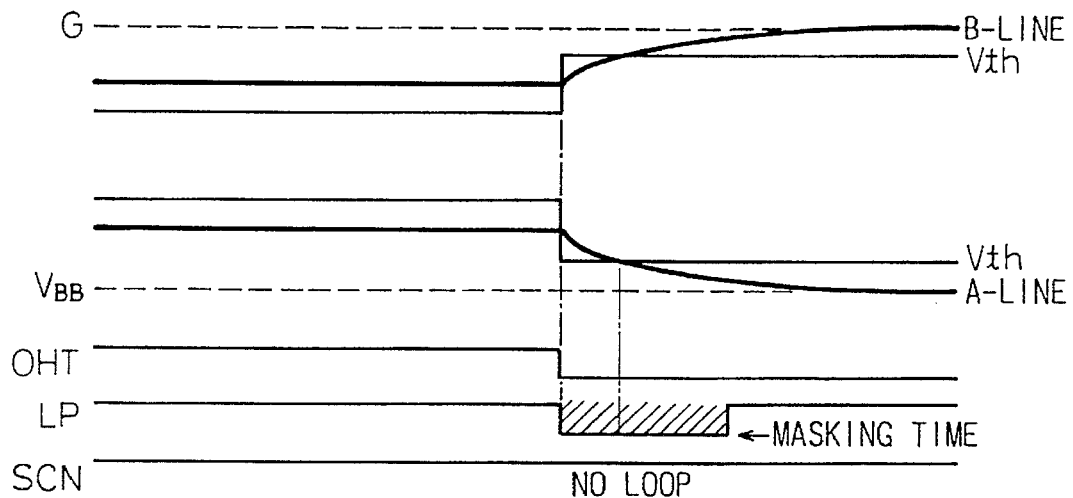
FIG. 19 is a view for explaining a method for digitally preventing erroneous detection as assumed in the present invention.

However, it is necessary to add a time-constant circuit comprising resistors and capacitors to the circuit of the threshold value Vth in the loop detection circuit 51 and further to make that time-constant match the time-constant when the bias voltage is applied to the A-line and the B-line. There arise problems that the number of parts is increased and the cost is increased due to the required improvement of the precision of the parts. Further, there is a problem in that work for adjustment of the time-constant etc. also becomes necessary as described hereinbefore. So as to solve the above-described problems, as shown in FIG. 19, the present inventor thought of digitally preventing the erroneous detection. Namely, he defined a predetermined time from the falling of the on-hook transmission signal OHT as a masking time and configured the issuing circuit 50 (refer to FIG. 15) such that the loop detection signal LP generated within this masking time is not issued as a normal SCN. By this, the loop detection signal LP' produced by the time difference from the threshold value when the potentials of the A-line and B-line return to the original potentials can be controlled so as not to be issued from the issuing circuit 50 to the scanner. However, in the method of this FIG. 19, there is a problem which will become clear in FIG. 20.

Figure 20:
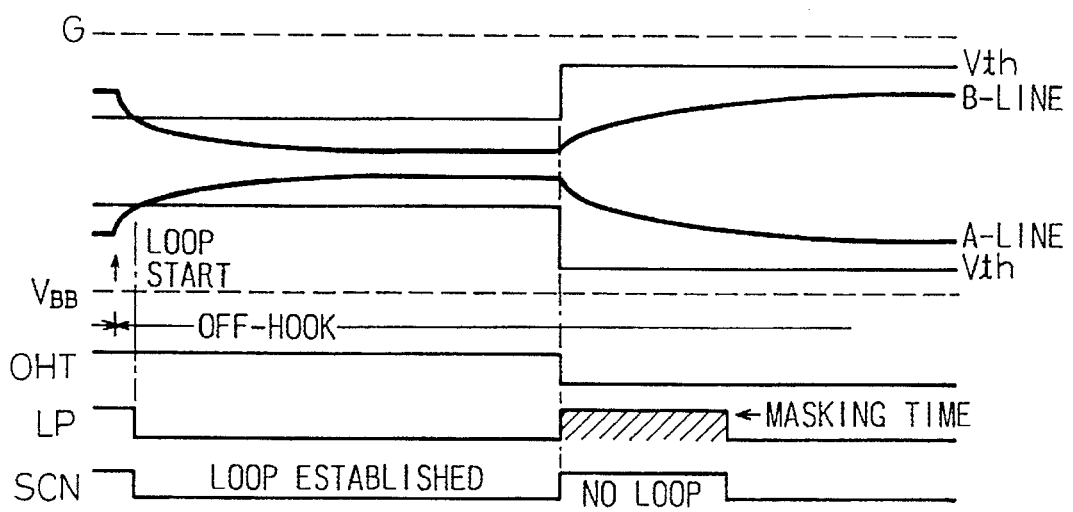
FIG. 20 is a view for explaining problems in the method of prevention of erroneous detection of FIG. 19.

As shown in FIG. 20, when a loop is formed by the subscriber 66 picking up the phone off the hook during the period where the on-hook transmission signal OHT is "1", a loop detection signal LP of "0" is issued from the loop detection circuit 51 and a loop detection signal SCN of "0" is issued from the issuing circuit 50 ("LOOP ESTABLISHED"). When the on-hook transmission signal OHT becomes "0", as mentioned before, a mask operation is carried out in the issuing circuit 50, to give a loop detection signal SCN of "1" indicating the absence of the loop detection signal LP ("NO LOOP")

In this way, after the loop detection signal SCN of "0" indicating the presence of the loop detection signal LP is once issued, the loop detection signal SCN of "1" indicating the absence of the loop detection signal LP is issued. This situation becomes equivalent to the situation where the subscriber 66 responds to the call and then places the phone back on the hook. For this reason, there is a problem that the call is disconnected irrespective of the fact that the subscriber has not cut off the call.

The present invention can solve this problem, as will be mentioned later.

Figure 1:
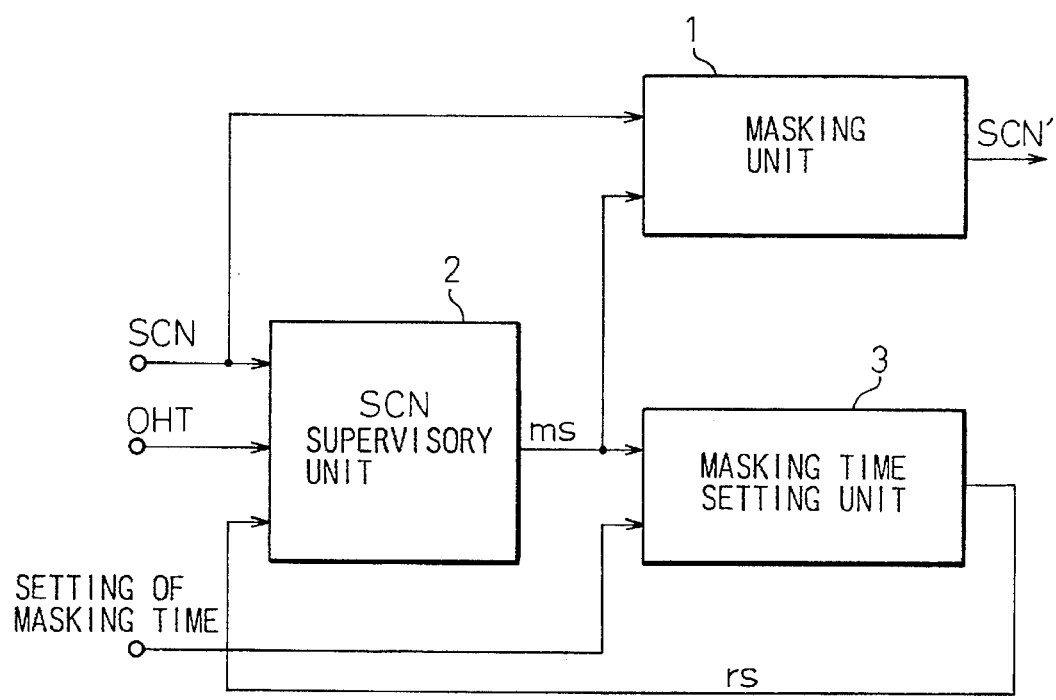
FIG. 1 is an explanatory view of the principle of the prevent invention.

Explaining the loop detection signal issuing circuit of the present invention referring to FIG. 1, the loop detection signal issuing circuit is a circuit in a subscriber circuit having an on-hook transmission facility while applying bias voltages to the subscriber line by an on-hook transmission signal OHT during the idle intervals of a ringer sent to the subscriber and, at the same time, changing the threshold value of the loop detection at the loop detection circuit to transmit information in the form of an AC signal such as a multifrequency signal to the subscriber. Provision is made of a masking unit 1 which controls whether to issue the loop detection signal SCN of the loop detection circuit without masking or to mask it by the masking signal ms assuming it as an erroneous detection signal (LP'); an SCN supervisory unit 2 which supervises the loop detection signal SCN from the loop detection circuit 51, assumes the loop detection signal SCN appearing right after the recovery of the on-hook transmission signal OHT as an erroneous detection signal, and applies the masking signal ms to the masking unit 1, while performs control so that the masking signal ms is not issued with respect to the loop detection signal SCN before the recovery of the on-hook transmission signal OHT; and a masking time setting unit 3 which is triggered by the rising of the masking signal ms sent from this SCN supervisory unit 2 and controls the SCN supervisory unit 2 so as to stop the sending of the masking signal ms after an elapse of the set masking time.

That is, the masking unit 1 controls whether or not to send the loop detection signal SCN from the loop detection circuit 51 as the SCN' as it is according to the masking signal ms. Also, the SCN supervisory unit 2 supervises the loop detection signal SCN from the loop detection circuit and does not output the masking signal ms for the loop detection signal SCN before the restoration of the on-hook transmission signal OHT. Therefore, the loop detection signal SCN is issued as SCN' as it is from the masking unit 1. Also, the loop detection signal SCN right after the restoration of the on-hook transmission signal OHT is assumed as an erroneous detection (LP') and the masking signal ms is output to the unit 1. Accordingly, the masking unit 1 masks the loop detection signal SCN so that it is not issued. Also, the masking time setting unit 3 applies a reset signal rs to the SCN supervisory unit 2 after an elapse of the set masking time from the rising of the masking signal ms from the SCN supervisory unit 2. By this, the masking signal ms is sent to the masking unit 1 during the set masking time and the issuance of the loop detection signal (LP') due to erroneous detection is prevented.

The SCN supervisory unit 2 may include a flip-flop which sends a masking signal ms due to a loop detection signal SCN from the loop detection circuit 51 at the time of the recovery of the on-hook transmission signal OHT and stops the sending of that masking signal ms by a reset signal rs from the masking time setting unit 3.

That is, the SCN supervisory unit 2 includes a flip-flop and sends the masking signal ms from the flip-flop when the loop detection signal SCN is not given right before the restoration of the on-hook transmission signal OHT. The flip-flop is reset by the reset signal rs from the masking time setting unit 3, whereby the output of the masking signal ms is stopped.

The SCN supervisory unit 2 may be constituted so as to supervise the loop detection signal SCN from the loop detection circuit in a predetermined time from the time of recovery of the on-hook transmission signal OHT and send the masking signal ms to the masking unit 1 first when the loop detection signal SCN is given within that predetermined time.

That is, the SCN supervisory unit 2 immediately sends the masking signal ms when the loop detection signal SCN is sent in the predetermined time from the time of restoration of the on-hook transmission signal OHT and prevents the issuance of a loop detection signal due to an erroneous detection.

The masking time setting unit 3 may include a counter which starts the count by the masking signal ms from the SCN supervisory unit 2 and enables setting of the presence or absence of the mask and the masking time from the outside.

That is, the masking time setting unit 3 includes a counter and enables control of the settings of this counter from the outside, whereby it can set either the absence of the mask or the presence of the mask. In the case of the presence of a mask, it can set the masking time. It can start the count of the clock signal at the counter by the masking signal ms from the SCN supervisory unit 2 and apply the reset signal rs to the SCN supervisory unit 2 after an elapse of the mask setting time.

The masking time setting unit 3 may include a shift register which starts a shift by the masking signal ms from the SCN supervisory unit 2 and can set the presence or absence of the mask and the masking time by the number of the shift stages.

That is, the masking time setting unit 3 includes a shift register which can be set as to the number of shift stages from the outside thereby to set the absence of a mask or the presence of a mask. In the case of the presence of a mask, it can set the masking time. It starts the shift operation of the shift register by the masking signal ms from the SCN supervisory unit 2, applies the shifted output as the reset signal to the SCN supervisory unit 2, and stops the output of the masking signal ms.

Figure 2:
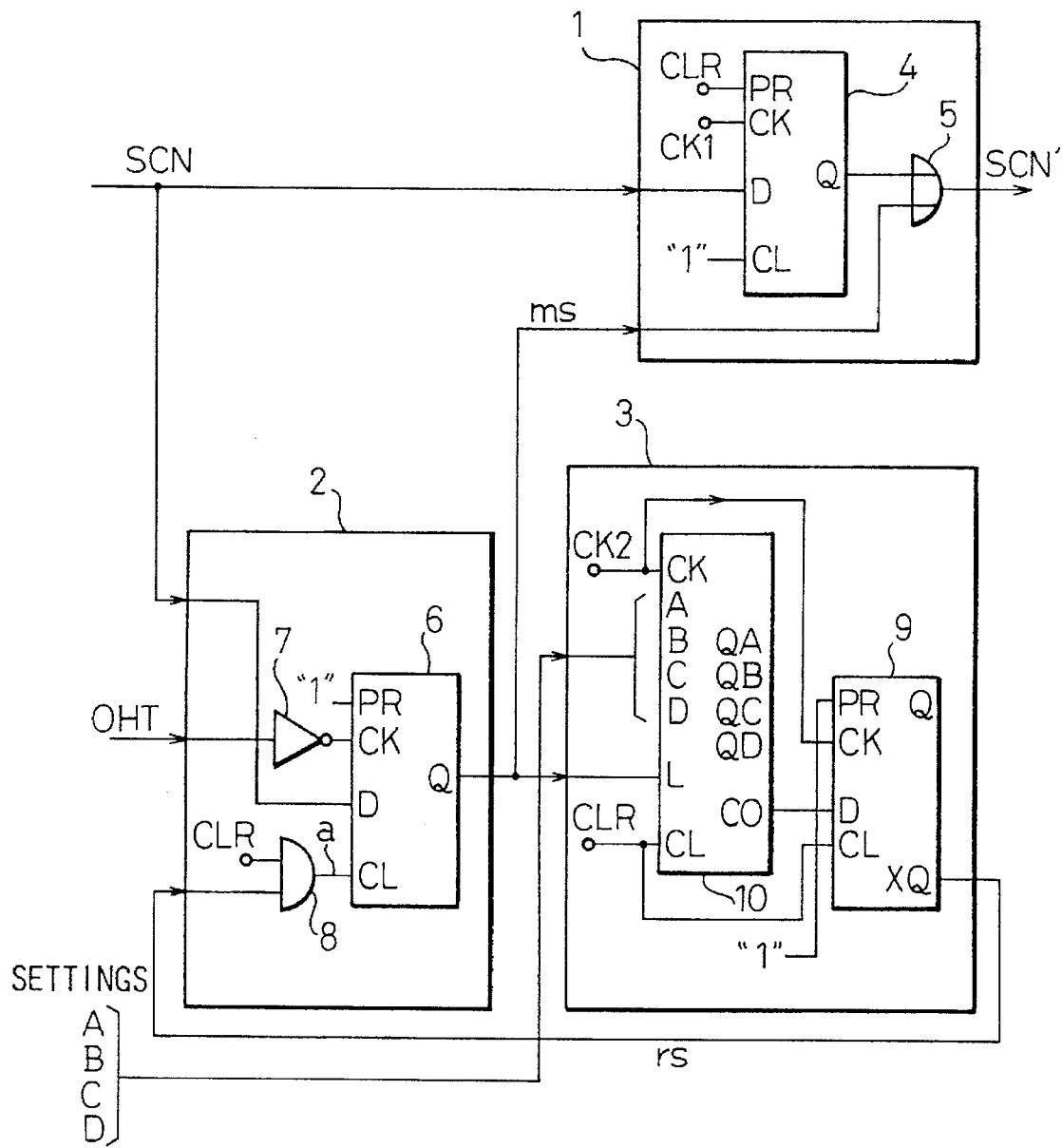
FIG. 2 is an explanatory view of a first embodiment of the present invention.

FIG. 2 is an explanatory view of the first embodiment of the present invention. The masking unit 1 is constituted by a flip-flop 4 and an OR circuit 5, and the SCN supervisory unit 2 is constituted by a flip-flop 6, an inverter 7, and an AND circuit 8. The masking time setting unit 3 is constituted by a flip-flop 9 and a counter 10. Also, the D's of the flip-flops 4, 6, and 9 are data terminals, CL is a clear terminal, CK, a clock terminal, PR, a preset terminal, and Q and XQ, output terminals. Also, the CK of the counter 10 is a clock terminal, A, B, C, and D are preset terminals, L is a load terminal, CL is a clear terminal, QA, QB, QC and QD are output terminals of the respective count stages, and CO is a carry-out terminal.

The loop detection signal SCN from the loop detection circuit (51) and the loop detection signal SCN' issued from the masking unit 1 to the scanner become "0" (low level) when indicating loop detection, while "1" (high level) when indicating no detection. The on-hook transmission signal OHT becomes "1" (high level) at the time of operation and becomes "0" (low level) at the time of non-operation. Also, CLR is a clear signal at the time of an initial setting, and CK1 and CK2 are clock signals.

The clear signal CLR is sent to the preset terminal PR of the flip-flop 4 forming the masking unit 1, the clock signal CK1 is sent to the clock terminal CK, the loop detection signal SCN from the loop detection circuit (51) is sent to the data terminal D, and "1" is sent to the clear terminal CL, respectively. The loop detection signal SCN' is issued from the output terminal Q via the OR circuit 5 to the scanner (not illustrated).

Also, "1" is sent to the preset terminal PR of the flip-flop 6 forming the SCN supervisory unit 2, the on-hook transmission signal OHT is sent to the clock terminal CK via the inverter 7, the loop detection signal SCN from the loop detection circuit is sent to the data terminal D, and the output signal a from the AND circuit 8 is sent to the clear terminal CL. The masking signal ms is output from the output terminal Q thereof. This masking signal ms is sent to the load terminal L of the counter 10 in the masking time setting unit 3 and the OR circuit 5 in the masking unit 1, respectively.

Also, the counter 10 in the masking time setting unit 3 is given with the clock signal CK2 at the clock terminal CK, given with the settings A, B, C, and D at the setting terminals A, B, C, and D, given with the aforementioned masking signal ms at the load terminal L, and given with the clear signal CLR at the clear terminal CL, respectively. The output signal from the carry-out terminal CO is sent to the data terminal D of the flip-flop 9. Also, the clock signal CK2 is sent to the clock terminal CK of the flip-flop 9 and the clear signal CLR is sent to the clear terminal CL, respectively. The output terminal XQ is a terminal which outputs an inverted signal with respect to the output terminal Q. The reset signal rs is sent from this output terminal XQ to the SCN supervisory unit 2.

The masking signal ms sent from the SCN supervisory unit 2 to the masking unit 1 becomes "1" when masking the loop detection signal SCN while becomes "0" when not masking the same. Also, the masking time created by the counter 10 in the masking time setting unit 3 can be set in a fixed manner, but the present figure shows a configuration wherein a desired masking time can be set by sending the settings A, B, C, and D from the outside to the setting terminals A, B, C, and D, respectively.

FIG. 3 is an explanatory view of a masking time setting in the first embodiment of the present invention and shows an example of a relationship between the setting conditions for the setting terminals A, B, C, and D of the counter 10 in the masking time setting unit 3 mentioned before and the masking time. For example, when the settings A, B, C, and D are all "0", the masking time becomes the maximum of CK2×16, while when they are "0110", the masking time becomes CK2×10. Also, when all of them are "1", the mask becomes absent. In this case, when defining the cycle of the clock signal CK2 as 2 ms, when the settings A, B, C, and D are made all "0", the masking time becomes the maximum 32 ms. Namely, it is possible to set two settings: the absence of a mask and a masking time of 4 ms to 32 ms at 2 ms intervals. Note that, by appropriately selecting the cycle of the clock signal CK2 and the number of count stages of the counter 10, various types of masking times can be set. The circuits 50 and 51 shown in FIG. 15 are formed commonly for all of the subscriber circuits by an LSI. If a certain subscriber circuit originally does not produce LP', the above-described all "1" is given to the LSI for this subscriber circuit.

Figure 4:
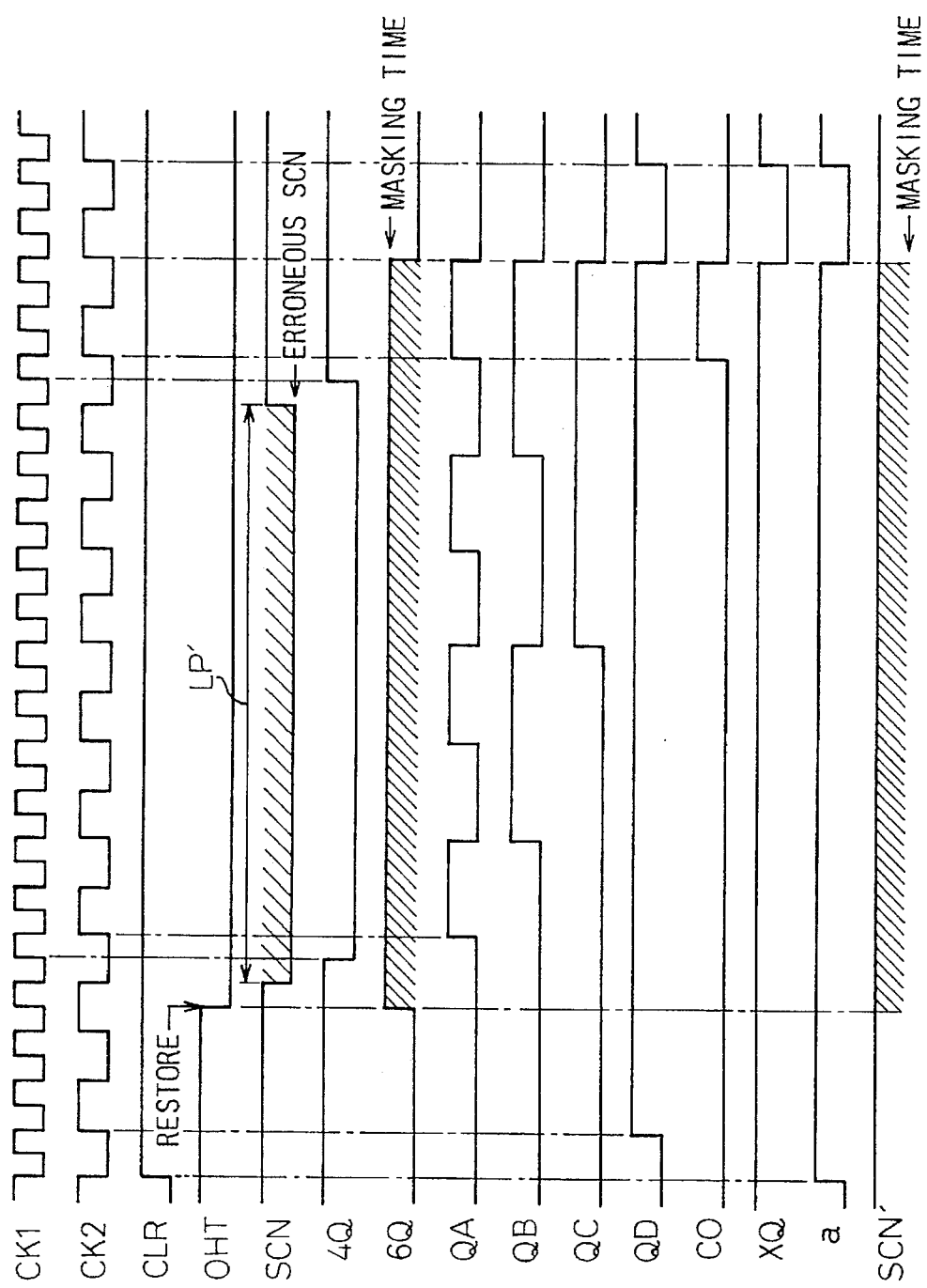
FIG. 4 is a timing chart of the case where a mask is set in the first embodiment of the present invention.

FIG. 4 is a timing chart at the time of the setting of the mask in the first embodiment of the present invention and shows an example of the signal waveform by the same symbols as the symbols in FIG. 2, in which 4Q and 6Q denote signals from the output terminals Q of the flip-flops 4 and 6, respectively. Also, the clock signal CK2 shows a case where the frequency of the clock signal CK1 is divided into one-half.

When the clear signal CLR is initialized by "0", the signal 4Q of the output terminal Q of the flip-flop 4 in the masking unit 1 becomes "1", the signal 6Q from the output terminal Q of the flip-flop 6 in the SCN supervisory unit 2 becomes "0", the signals from both of the output stages QA to QD of the counter 10 and the carry-out terminal CO become "0", and signal from the output terminal XQ of the flip-flop 9 becomes "1". Accordingly, when the clear signal CLR becomes "1" next, the output signal a from the AND circuit 8 becomes "1".

The settings A, B, C, and D are loaded in the counter 10 at the rising of the clock signal CK2 after the initial setting. In FIG. 3, where the settings are not all "0" (the masking time is the maximum) and for example the settings A, B, C, and D are "0001", the signal from the carry-out terminal CO becomes "0", the signals from the output terminals QA to QC of the counter 10 become "0", and the signal from the terminal QD becomes "1". Also, since the clear signal CLR is "1" and the signal from the output terminal XQ of the flip-flop 9 is "1", the output signal a of the AND circuit 8 becomes "1" and the SCN supervisory unit 2 enters into a state where the erroneous loop detection signal is supervised.

When the on-hook transmission signal OHT returns from "1" to "0", where the loop detection signal SCN is "1" (non-detection of loop), the signal 6Q from the output terminal Q of the flip-flop 6 becomes "1". Even in a case where the loop detection signal SCN from the loop detection circuit (51) becomes "0" indicating the loop detection, the loop detection signal SCN' issued to the scanner becomes "1" until the flip-flop 6 is reset, and therefore masking is carried out.

Namely, when the loop detection signal SCN right after when the on-hook transmission signal OHT returns from "1" to "0" becomes "0" (loop detection) as indicated as the erroneous SCN, the signal 4Q from the output terminal Q of the flip-flop 4 becomes "0" at the rising of the clock signal CK 1. However, since this loop detection signal SCN is caused by an erroneous detection, this loop detection signal SCN of "0" is masked by the masking signal ms of "1" at the masking unit 1, and the loop detection signal SCN' to the scanner is made "1" (non-detection of loop) during the masking time shown by the hatching. Namely, the erroneous detection signal can be masked.

When the signal 6Q from the output terminal Q of the flip-flop 6 becomes "1", that is, the masking signal ms becomes "1", the counter 10 starts the count of the clock signal CK2. When the signals from the output terminals QA to QD of the counter 10 become "1", the signal from the carry-out terminal CO becomes "1". By this, the flip-flop 9 is set at the rising of the next clock signal CK2, and the signal from the output terminal XQ thereof becomes "0". Namely, the reset signal rs of "0" is sent to the SCN supervisory unit 2. Accordingly, the output signal a of the AND circuit 8 becomes "0", the flip-flop 6 is reset, and the signal 6Q from the output terminal Q thereof becomes "0". Namely, the output of the masking signal ms is stopped. When the loop detection signal SCN becomes "1" (non-detection of loop) before this time, the signal 4Q from the output terminal Q of the flip-flop 4 becomes "1", and the loop detection signal SCN' to the scanner becomes "1" (non-detection of loop).

Also, in the counter 10, the signal from the output terminal Q of the flip-flop 6 becomes "0", whereby the settings A, B, C, and D are set, and the signal from the carry-out terminal CO becomes "1". Accordingly, at the rising of the next clock signal CK2, the flip-flop 9 is set, and the signal from the output terminal XQ thereof becomes "1", and therefore the output signal a from the AND circuit 8 becomes "1". By this, the reset of the flip-flop 6 is released, and the supervision of the erroneous detection is started again.

Also, when the loop detection signal SCN becomes "0" before the on-hook transmission signal OHT returns from "1" to "0", the flip-flop 6 of the SCN supervisory unit 2 is not set even when the on-hook transmission signal OHT returns from "1" to "0" and therefore the signal 6Q from the output terminal Q thereof remains "0" and the masking signal ms is not output.

Accordingly, the output of the flip-flop 4 in the masking unit 1 also becomes "0" at the timing of the clock signal CK1, and the loop detection signal SCN' of "0" indicating loop detection is issued to the scanner. Namely, when the on-hook transmission signal OHT is "1" (operation), where the loop detection circuit 51 detects a loop due to the subscriber picking up the phone off the hook, this loop detection is not erroneous and therefore the masking operation at the masking unit 1 is stopped. It is decided that the loop detection signal SCN appearing in the masking time right after the on-hook transmission signal OHT returns from "1" to "0" is due to erroneous detection and is masked.

Figure 5:
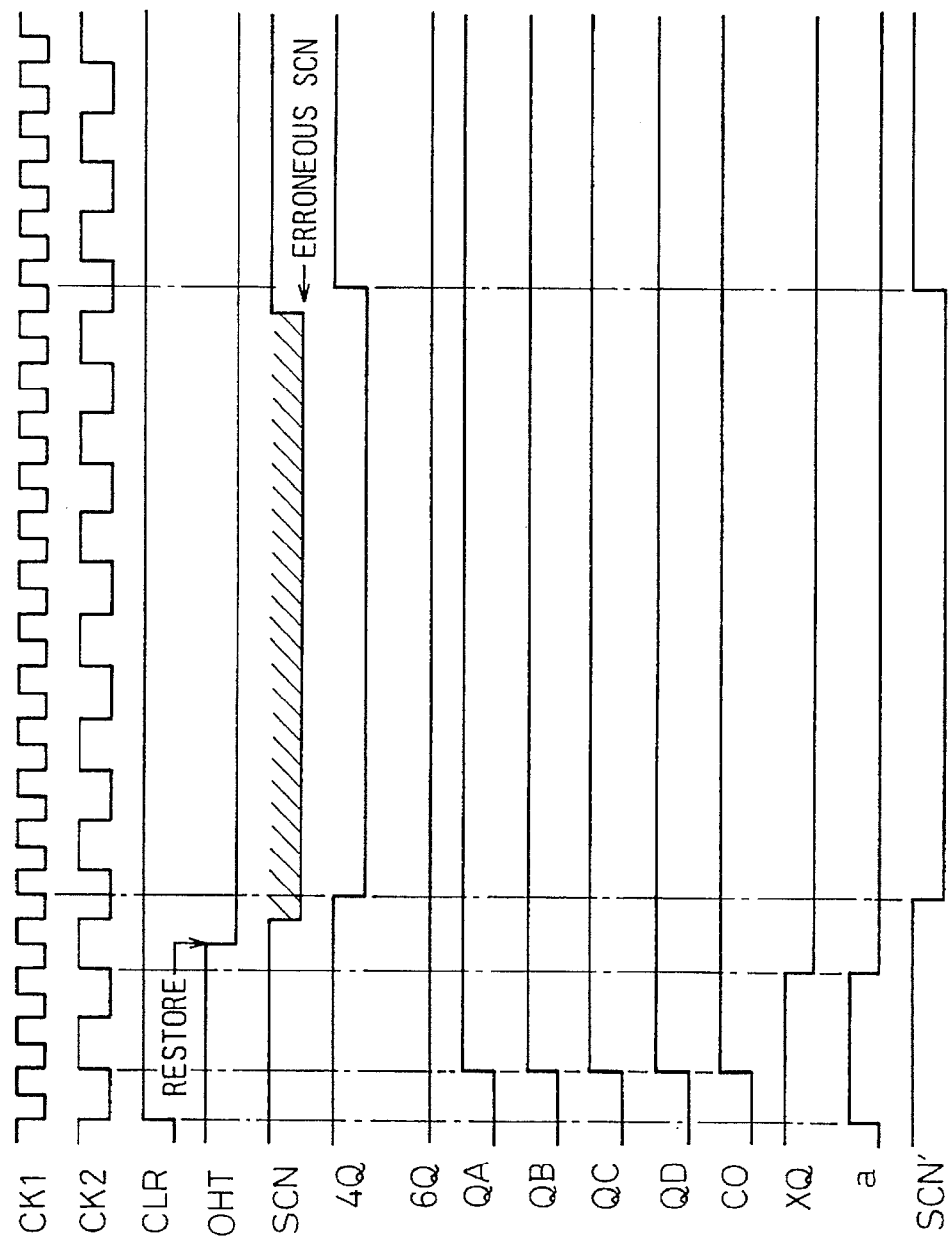
FIG. 5 is a timing chart of the case where a mask is not set in the first embodiment of the present invention.

FIG. 5 is a timing chart of the case when the mask is not set in the first embodiment of the present invention, in which same symbols as those of FIG. 4 indicate the same signals. It shows a case where the settings A, B, C, and D shown in FIG. 3 are made all "1" corresponding to the absence of a mask. Accordingly, after the clear signal CLR is initially set to "0", the signals from the output terminals QA to QD of the counter 10 become "1" at the rising of the next clock signal CK2 and also the signal from the carry-out terminal CO becomes "1".

The flip-flop 9 is set at the rising of the next clock signal CK2, and the signal from the output terminal XQ thereof becomes "0". Therefore, the reset signal rs of "0" is sent to the AND circuit 8, and the output signal a thereof becomes "0". By this, the flip-flop 6 is reset, the signal 6Q from the output terminal Q thereof becomes "0", and a state of no masking is exhibited. Also, the signal 6Q from the output terminal Q of the flip-flop 6 is "0", and therefore all "1" are set to the setting terminals A, B, C, and D of the counter 10 at the rising of the clock signal CK2, and the signal from the carry-out terminal CO becomes "1". By this, as mentioned before, the flip-flop 6 is reset and the state of absence of a mask is continued.

Accordingly, when the loop detection signal SCN right after the on-hook transmission signal OHT returns from "1" to "0" becomes "0" indicating loop detection, in the flip-flop 4 of the masking unit 1, the signal 4Q from the output terminal Q thereof becomes "0" at the rising of the clock signal CK1. The masking signal ms is now "0", and therefore the loop detection signal SCN' to the scanner becomes "0" indicating a loop detection, and the loop detection signal SCN is sent as it is as SCN'. Namely, it becomes possible to optionally set whether or not to mask the erroneous detection of the loop detection right after the restoration of the on-hook transmission signal OHT and optionally set the masking time.

Figure 6:
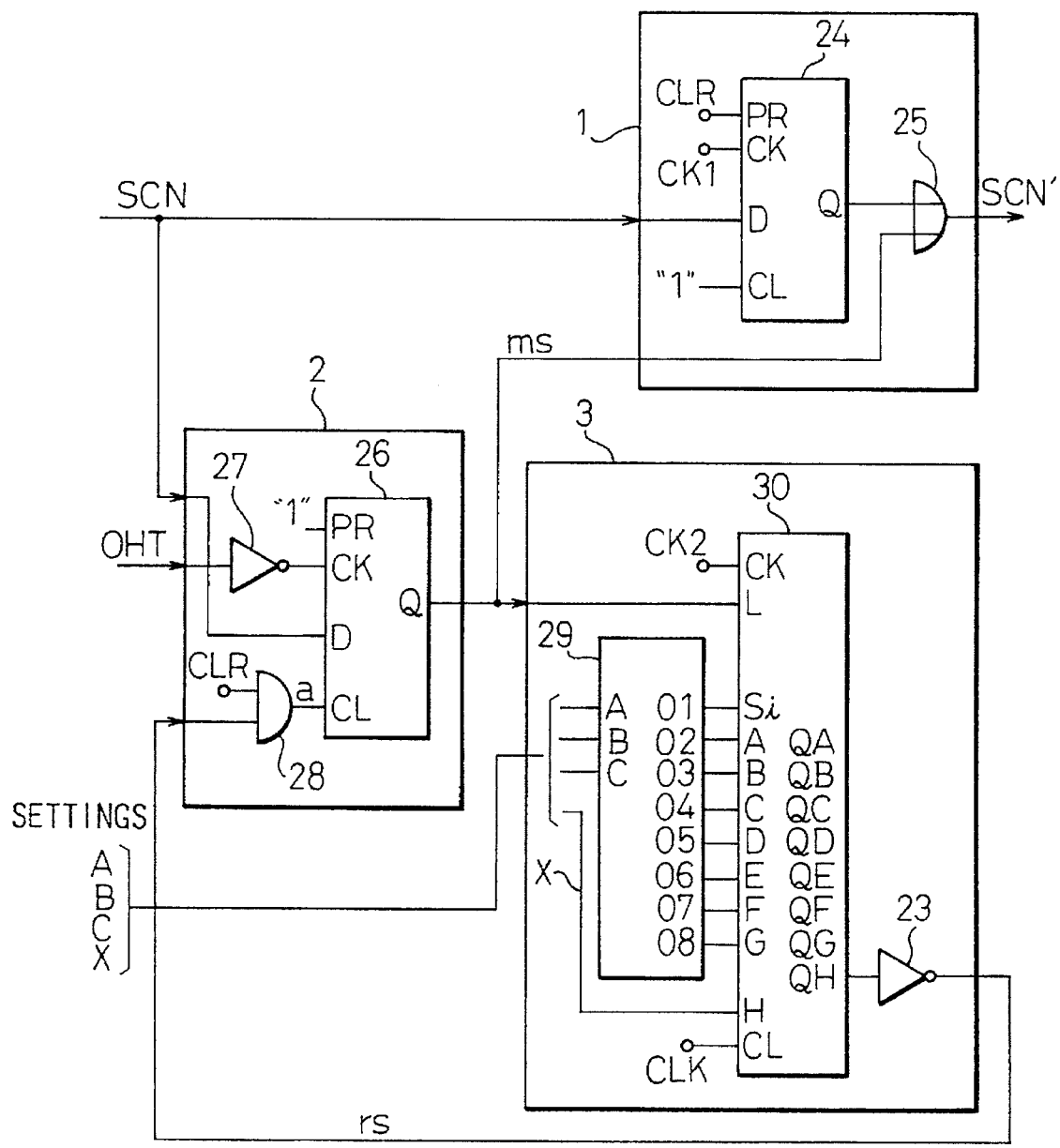
FIG. 6 is an explanatory view of a second embodiment of the present invention.

FIG. 6 is an explanatory view of the second embodiment of the present invention, in which the same symbols as those of FIG. 2 indicate the same parts. The masking unit 1 is constituted by a flip-flop 24 and an OR circuit 25, the SCN supervisory unit 2 is constituted by a flip-flop 26, an inverter 27, and an AND circuit 28, and the masking time setting unit 3 is constituted by an inverter 23, a selector 29, and a shift register 30.

The masking unit 1 masks the loop detection signal SCN of "0" when the masking signal ms of "1" is sent from the SCN supervisory unit 2. In the SCN supervisory unit 2, when the loop detection signal SCN of "0" (loop detection) is sent before the on-hook transmission signal OHT returns from "1" to "0", the flip-flop 26 in the unit 2 is unchanged. Accordingly, the masking signal ms of "1" is not output. However, when the loop detection signal SCN of "1" (non-detection of loop) is sent when the on-hook transmission signal OHT returns from "1" to "0", the flip-flop 26 is set. Accordingly, the masking signal ms of "1" is sent to the masking unit 1. Thereafter, when the reset signal rs from the masking time setting unit 3 is sent to the unit 2, the issuance of the masking signal ms is suspended.

The masking time setting unit 3 has a selector 29 for selecting one of the terminals of 01 to 08 by the settings A, B, and C. "1" is set to the setting terminals Si, A, B, C, D, E, F, and G of the shift register 30 from the terminals 01 to 08 of this selector 29. Also, the setting X is sent to the setting terminal H of the shift register 30. This shift register 30 starts the shift in synchronization with the clock signal CK2 by the masking signal ms of "0". When the signal from the output terminal QH thereof becomes "1", the reset signal rs of "0" is sent to the SCN supervisory unit 2 via the inverter 23.

FIG. 7 is an explanatory view of the setting of masking time in the second embodiment of the present invention. For example, when defining the setting X as "1", there is no masking irrespective of the other settings A, B, and C. Namely, by sending "1" at the setting terminal H of the shift register 30, the signal from the output terminal QH thereof becomes "1", and the reset signal rs of "0" is sent to the SCN supervisory unit 2 via the inverter 23. By this, the masking signal ms of "1" is not output.

Also, when the settings A, B, C, and D are all made "0", the signal from the 01 terminal of the selector 29 becomes "1". When the masking signal ms becomes "1", that "1" is shifted in synchronization with the clock signal CK2, the signal from the output terminal QH becomes "1", and the reset signal rs ("1") is sent to the SCN supervisory unit 2. In this case, the masking time until the issuance of the masking signal ms is stopped becomes the maximum CK2×8. As mentioned before, if the clock signal CK2 has a cycle of 2 ms, the masking time becomes 16 ms. Thus, selective setting of the absence of masking and the presence of masking becomes possible and, at the same time, in the case of the presence of masking, the masking time of 2 ms to 16 ms can be set at every 2 ms intervals.

Figure 8:
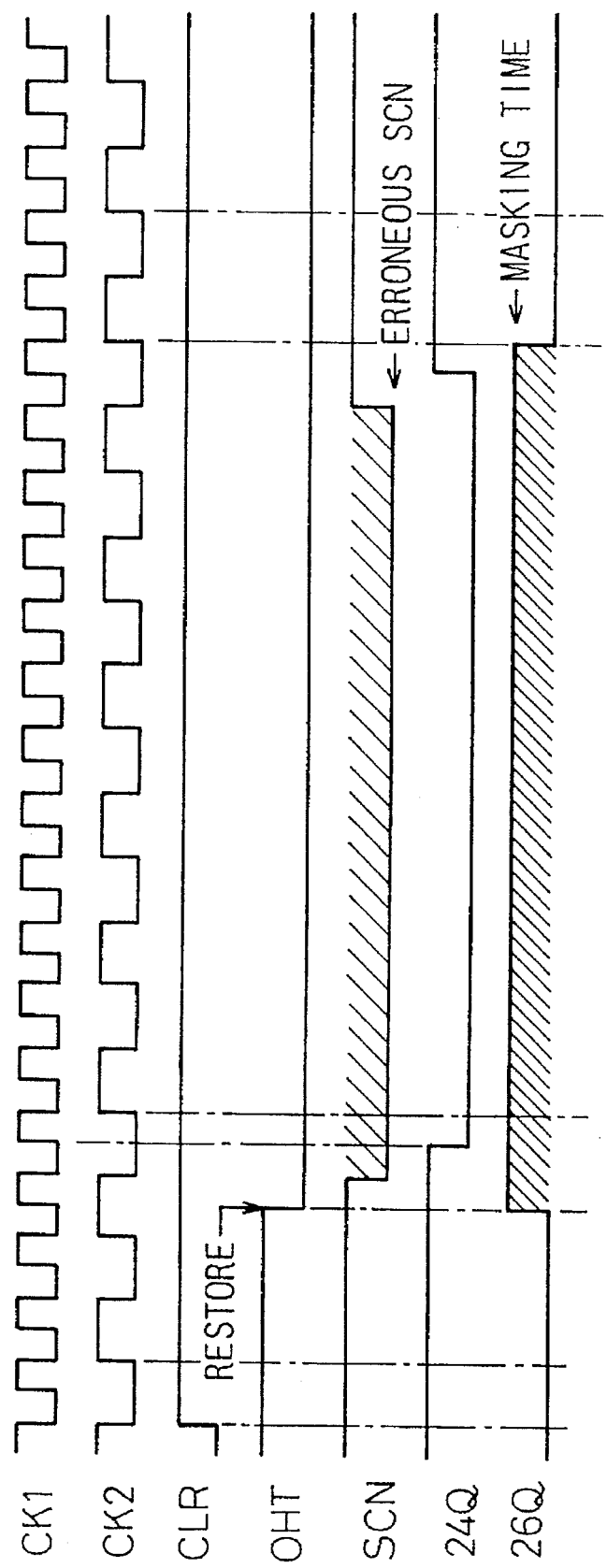
FIG. 8 is a timing chart of the case where a mask is set in the second embodiment of the present invention (first)
Figure 9:
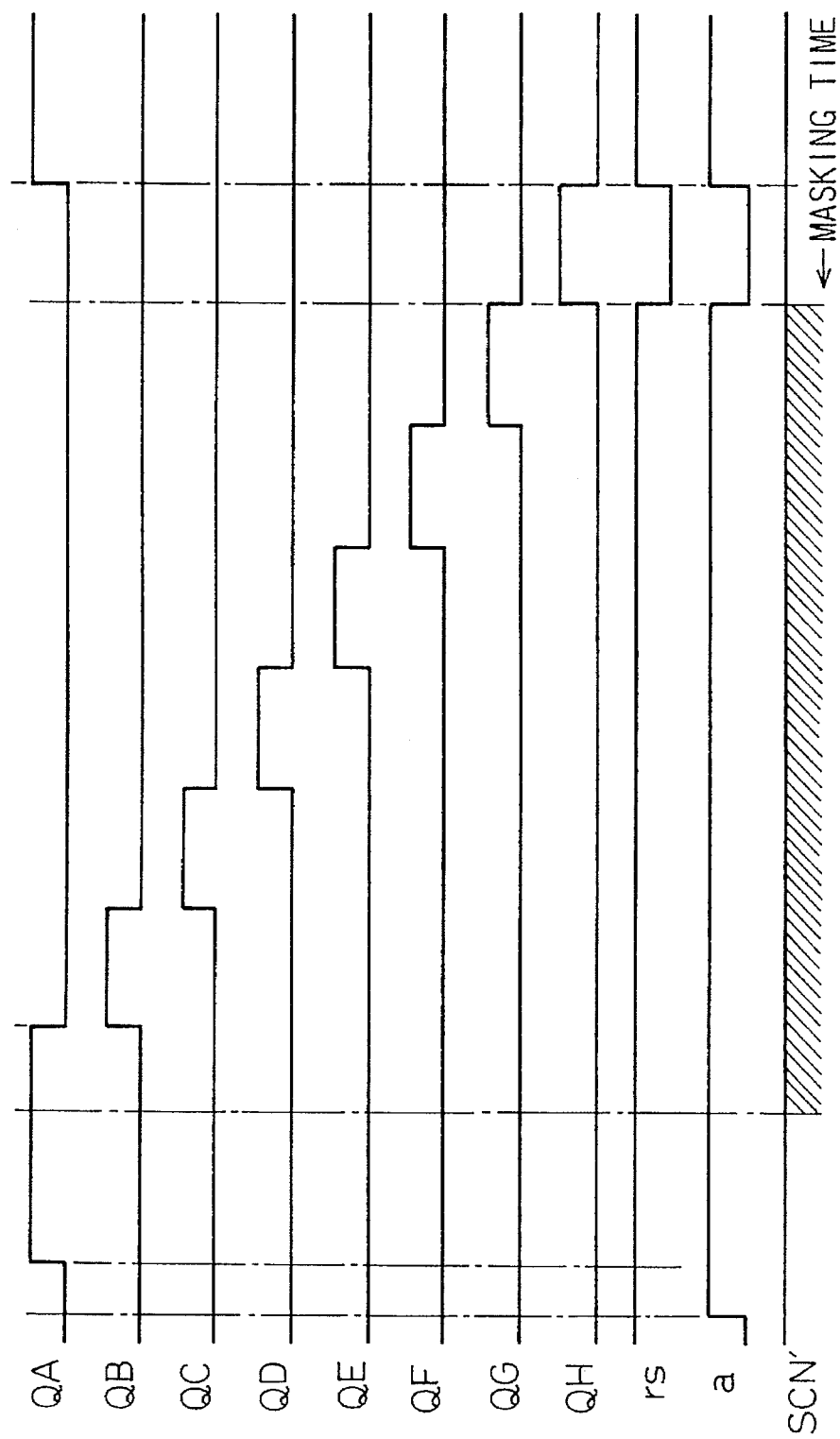
FIG. 9 is a timing chart of the case where a mask is set in the second embodiment of the present invention (second)

FIG. 8 and FIG. 9 are timing charts at the time of the setting of a mask in the second embodiment of the present invention, in which examples of signal waveforms of the respective portions of FIG. 6 are represented by the same symbols. Note that, 24Q and 26Q denote the signals from the respective output terminals Q of the flip-flops 24 and 26, respectively. Also, the case is shown where the settings A, B, C, and X are made "1000" and where according to "100" of the settings A, B and C, only the signal from the 02 terminal of the selector 29 becomes "1".

Also, the clock signal CK2 indicates a case where the frequency of the clock signal CK1 is divided into one-half. If the clear signal CLR is initially set as "0", the signal 24Q from the output terminal Q of the flip-flop 24 becomes "1", the signal 26Q from the output terminal Q of the flip-flop 26 becomes "0", and the signal from the output terminal QH of the shift register 30 becomes "0".

By this initial setting, the loop detection signal SCN' to the scanner (FIG. 15) becomes "1" indicating the non-detection of a loop, the masking signal ms becomes "0", and the reset signal rs becomes "1" At the rising of the next clock signal CK2, "1" from the 02 terminal of the selector 29 is loaded to the setting terminal A of the shift register 30.

Where the loop detection signal SCN from the loop detection circuit (51) is "1" (non-detection of loop) when the on-hook transmission signal OHT returns from "1" to "0", the flip-flop 26 in the SCN supervisory unit 2 is set, and the signal 26Q from the output terminal Q thereof becomes "1". Namely, the masking signal ms of "1" is sent to the masking unit 1. Accordingly, right after the restoration of the on-hook transmission signal OHT, as indicated as erroneous SCN in FIG. 8, even if a loop detection signal SCN of "0" (loop detection) is given and the signal 24Q from the output terminal Q of the flip-flop 24 becomes "0", during the masking time shown by the hatching, the loop detection signal SCN' of "1" (non-detection of loop) is issued to the scanner by the masking signal ms. Namely, the signal of an erroneous detection (LP') can be masked.

Also, where the loop detection signal SCN from the loop detection circuit (51) becomes "0" (loop detection) before the on-hook transmission signal OHT is restored, the masking signal ms is "0". Also, in the flip-flop 24, the signal 24Q from the output terminal Q thereof becomes "0" at the rising of the clock signal CK1. In this case, the loop detection signal SCN' of "0" (loop detection) is issued to the scanner as a correct loop detection.

Also, when the masking signal ms of "1" is output, the shift register 30 performs the shift operation in synchronization with the clock signal CK2 to shift the "1" which has been set to the setting terminal A. By this, the output terminals QA to QH sequentially become "1" (refer to FIG. 9). Then, when the output terminal QH becomes "1", the reset signal rs of "0" is sent to the AND circuit 28 in the SCN supervisory unit 2 via the inverter 23, and the output signal a thereof becomes "0", so that the flip-flop 26 is reset. Here, the masking signal ms becomes "0". Namely, the output of the masking signal ms of "1" is suspended after an elapse of the masking time set in the masking time setting unit 3.

Figure 10:
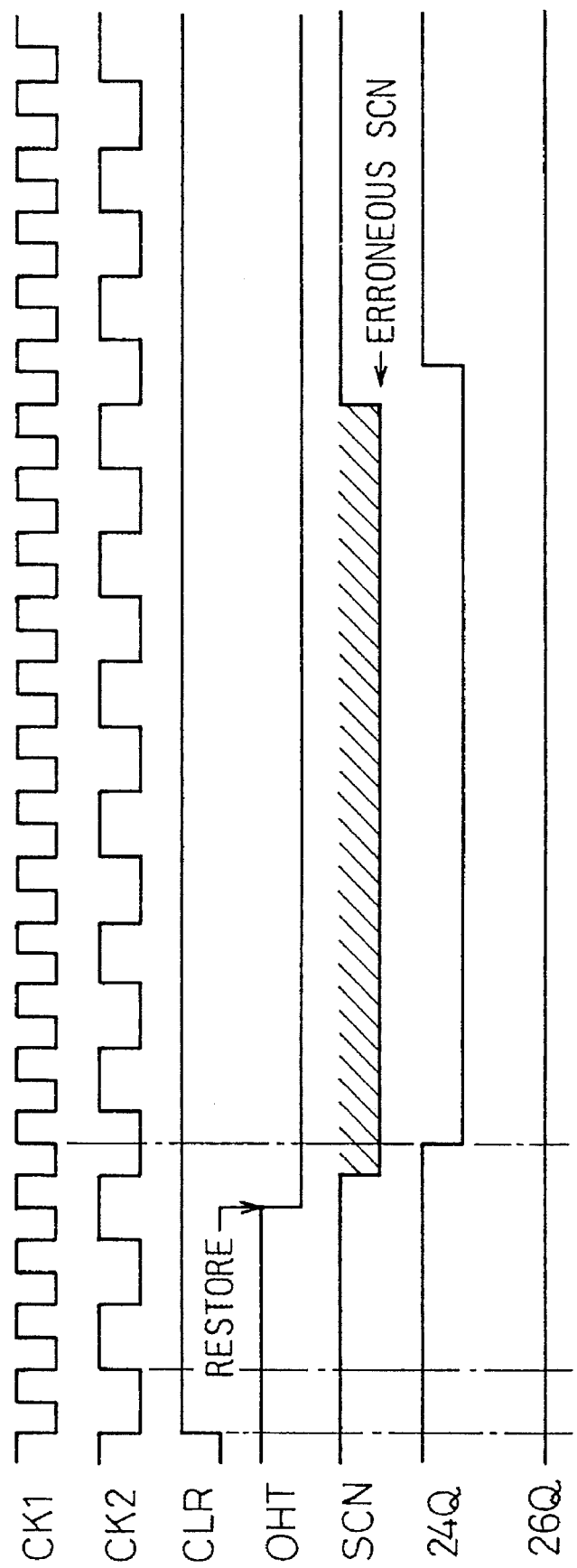
FIG. 10 is a timing chart where a mask is not set in the second embodiment of the present invention (first)
Figure 11:
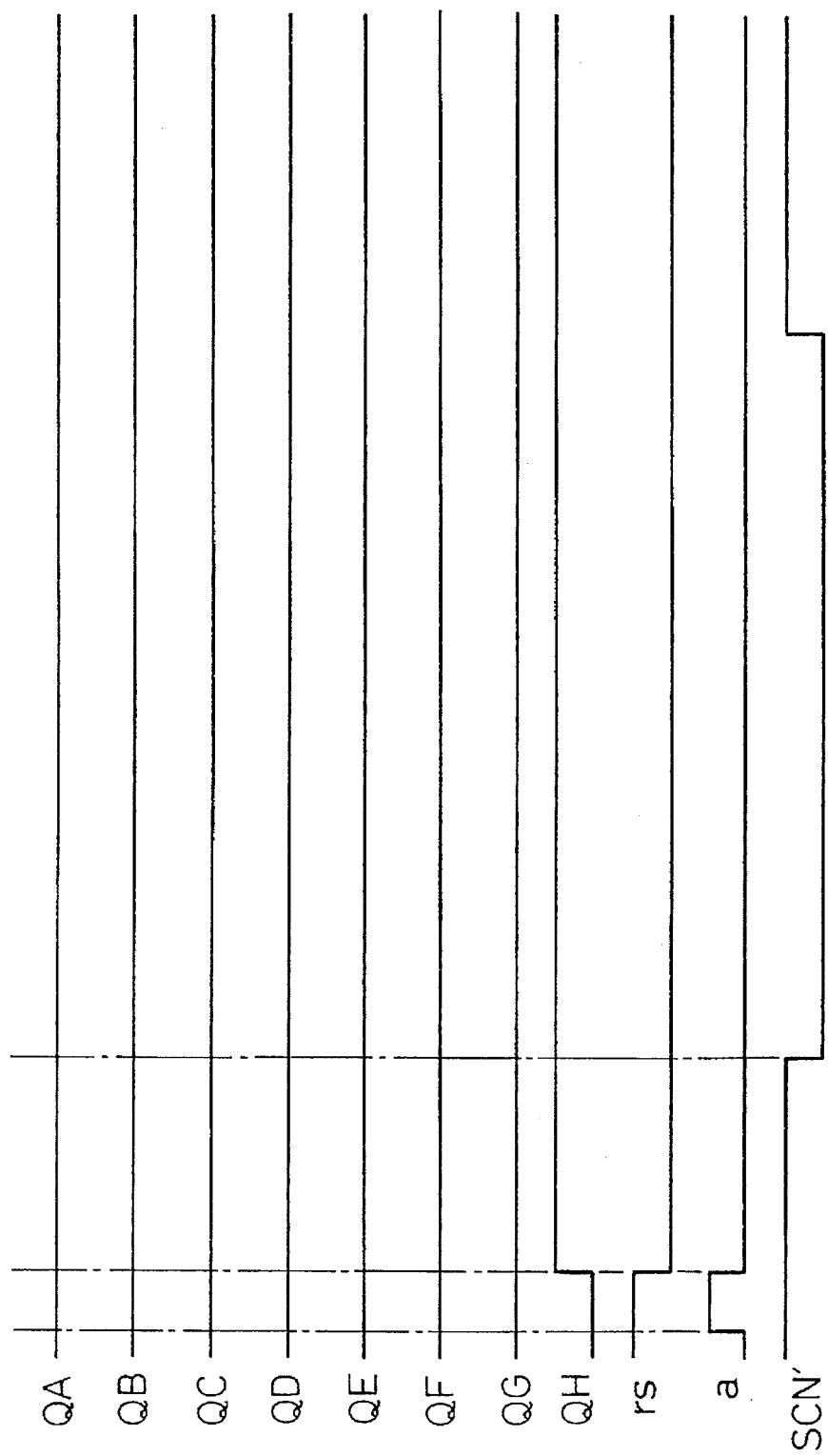
FIG. 11 is a timing chart of the case where a mask is not set in the second embodiment of the present invention (second)

FIG. 10 and FIG. 11 are timing charts of the case when the mask is not set in the second embodiment of the present invention, in which the same symbols as those of FIG. 8 and FIG. 9 indicate the same signals. In this case, the setting X is made "1". When the masking signal ms is "0", this "1" is set, at the rising of the clock signal CK2, in the setting terminal H of the shift register 30.

In the same way as in the above description, when the initial setting is carried out by the clear signal CLR of "0", the signal 24Q from the output terminal Q of the flip-flop 24 becomes "1", the signal 26Q from the output terminal Q of the flip-flop 26 becomes "0", and the signal from the output terminal QH of the shift register 30 becomes "0". Further, at the rising of the next clock signal CK2, "1" is set to the setting terminal H of the shift register 30 as mentioned before, and therefore the signal from the output terminal QH becomes "1".

By this, the reset signal rs of "0" is sent to the SCN supervisory unit 2. Namely, the flip-flop 26 in the SCN supervisory unit 2 is reset, and therefore the masking signal ms of "0" is obtained. By this, the masking unit 1 issues the loop detection signal SCN from the loop detection circuit (51) as SCN' to the scanner via the flip-flop 24 and the OR circuit 25 without masking.

Accordingly, the loop detection signal SCN of "0" indicated as the erroneous SCN in FIG. 10 after the on-hook transmission signal OHT returns from "1" to "0" is not masked and is issued to the scanner as the loop detection signal SCN' (refer to FIG. 11) of "0" (loop detection).

Figure 12:
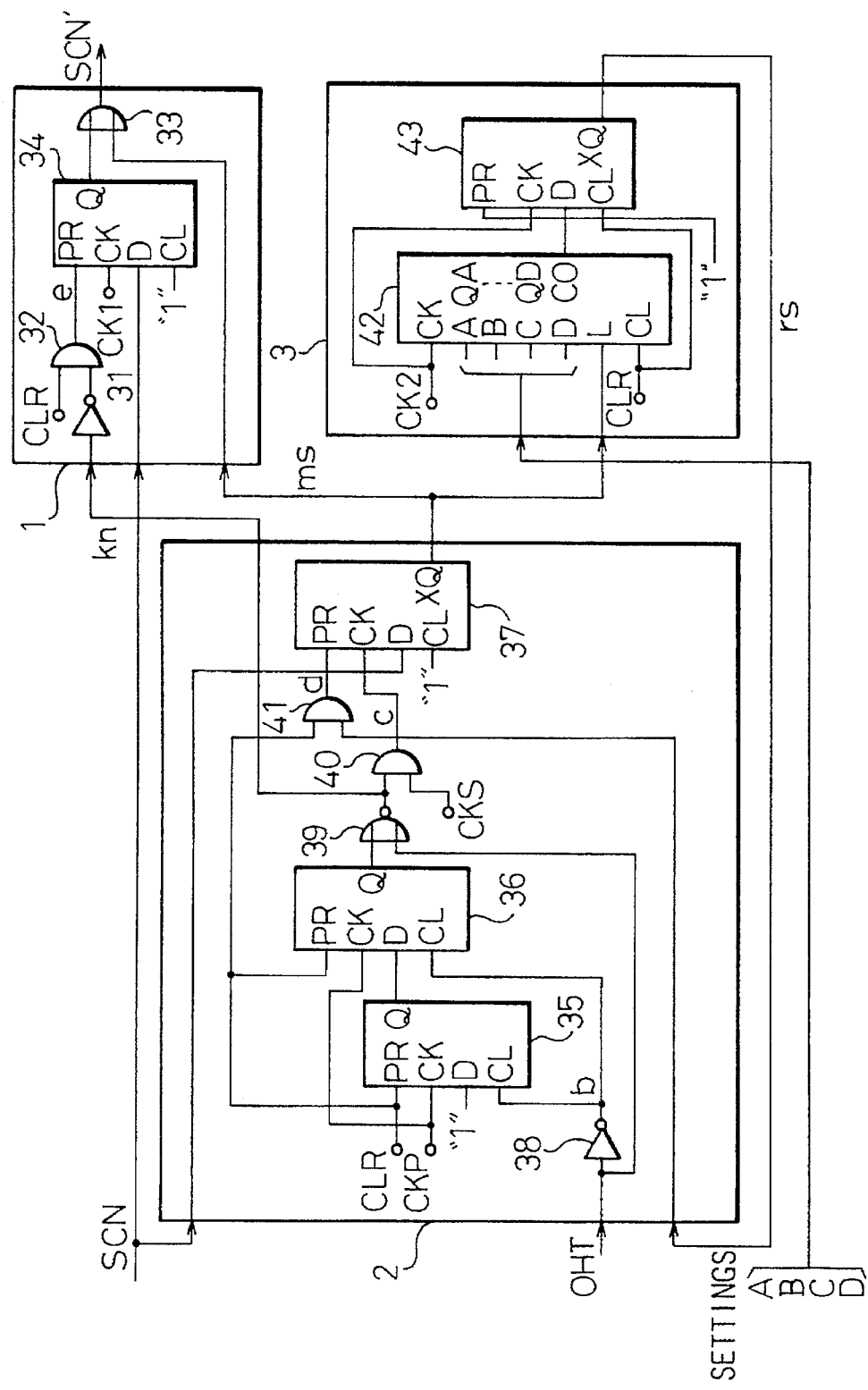
FIG. 12 is an explanatory view of a third embodiment of the present invention.

FIG. 12 is an explanatory view of the third embodiment of the present invention, in which the masking unit 1 is constituted by a flip-flop 34, an inverter 31, an AND circuit 32, and an OR circuit 33. The SCN supervisory unit 2 is constituted by the flip-flops 35 to 37, an inverter 38, a NOR circuit 39, and AND circuits 40 and 41. The masking time setting unit 3 is constituted by a counter 42 and a flip-flop 43. Note that the same symbols as those of FIG. 2 and FIG. 6 indicate the same signals, and both of CKP and CKS are clock signals.

The masking time setting unit 3 sets the absence of a mask or the presence of a mask by the settings A, B, C, and D set in the counter 42 in the same way as the first embodiment shown in FIG. 2. In the case of the presence of a mask, it sets the masking time. Also, the masking signal ms is issued from the output terminal XQ of the flip-flop 37 in the SCN supervisory unit 2. The reset signal rs from the masking time setting unit 3 is sent to the preset terminal PR of the flip-flop 37 via the AND circuit 41. Also, in the masking unit 1, the loop detection signal SCN of "0" (loop detection) from the loop detection circuit (51) is masked by the masking signal ms of "1" from the SCN supervisory unit 2.

Figure 13:
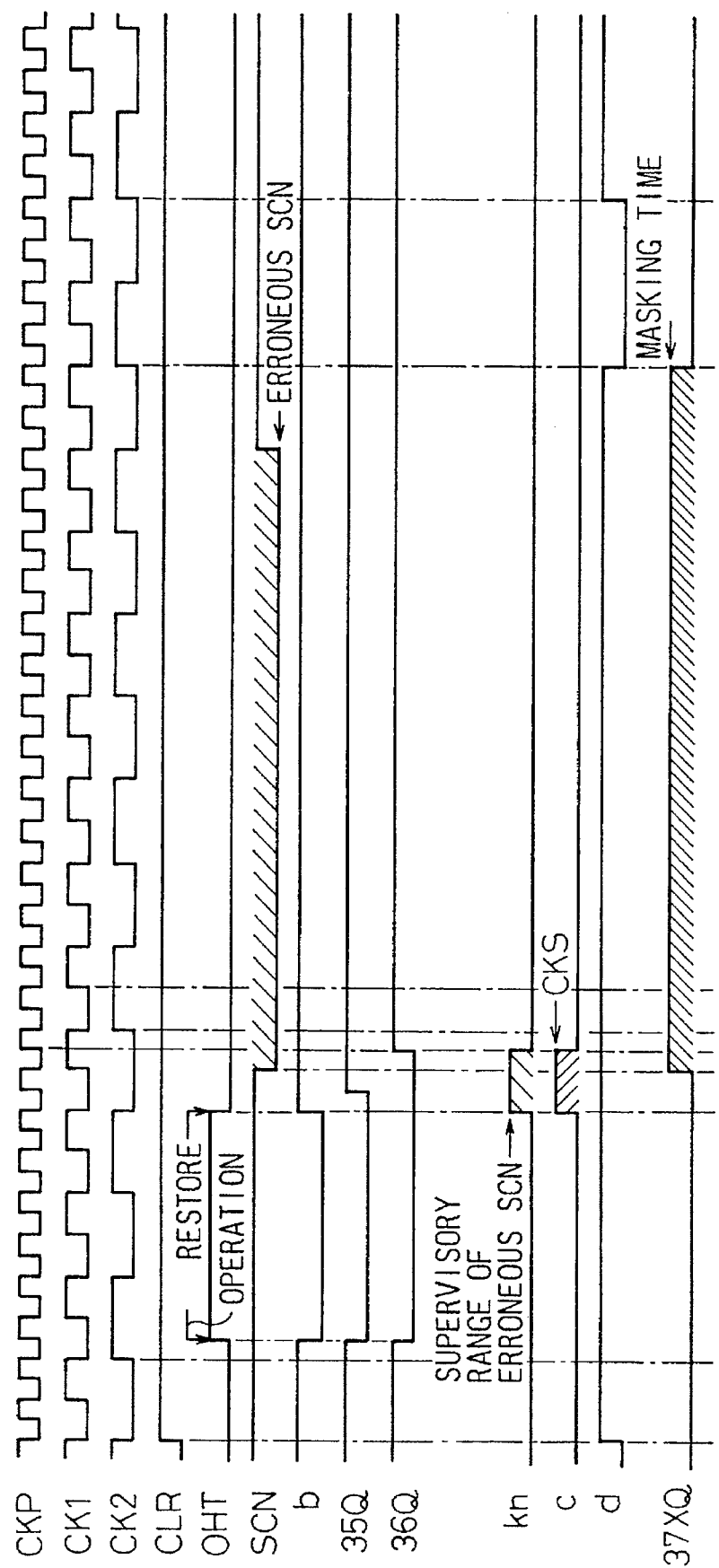
FIG. 13 is a timing chart of the case where a mask is set in the third embodiment of the present invention (first)
Figure 14:
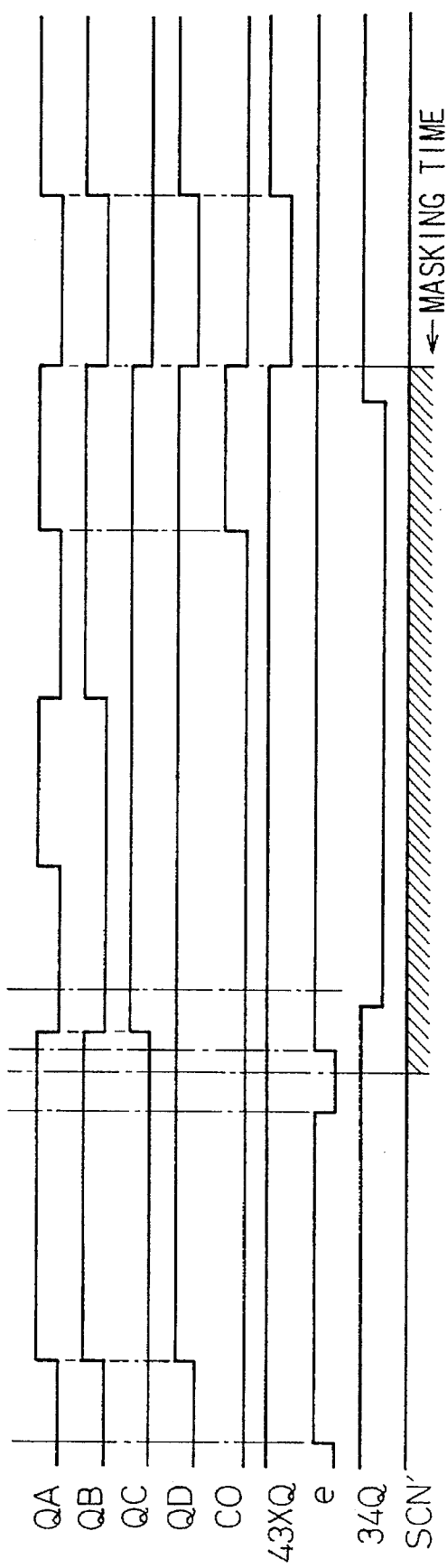
FIG. 14 is a timing chart of the case where a mask is set in the third embodiment of the present invention (second)

FIG. 13 and FIG. 14 are timing charts at the time of setting of a mask in the third embodiment of the present invention. The clock signal CKP has a rate two times higher than that of the clock signal CK1, and the clock signal CKS (FIG. 12) is at a further higher rate than that of the clock signal CKP. Also, 35Q, 36Q, 37XQ, 43XQ and 34Q denote the output signals from the respective output terminals Q and XQ of the flip-flops 35, 36, 37, 43, and 34. Also, b, c, d, and e denote signals of the same symbols in FIG. 12. Also, the settings A, B, C, and D show a case of "1101" of No. 12 of FIG. 3 as an example.

By performing the initial setting by making the clear signal CLR "0", the signals 35Q and 36Q from the respective output terminals Q of the flip-flops 35 and 36 become "1", the signal 37XQ from the output terminal XQ of the flip-flop 37 becomes "0", the signal 43XQ from the output terminal XQ of the flip-flop 43 becomes "1", the signal 34Q from the output terminal Q of the flip-flop 34 becomes "1", and the loop detection signal SCN' issued to the scanner becomes "1" (non-detection of loop). Also, the masking signal ms becomes "0".

At the rising of the next clock signal CK2, the aforementioned settings A, B, C, and D of "1101" are set in the counter 42. The signals from the output terminals QA to QD become "1101", and the signal from the carry-out terminal CO becomes "0". When the on-hook transmission signal OHT is changed from "0" to "1", the output signal b from the inverter 38 becomes "0", the flip-flops 35 and 36 are reset, and the signals 35Q and 36Q from the respective output terminals Q become "0".

When the on-hook transmission signal OHT returns from "1" to "0", the output signal b from the inverter 38 becomes "1". At this time, the signal 36Q of the output terminal Q of the flip-flop 36 is "0", and therefore the output signal kn from the NOR circuit 39 becomes "1". The output signal kn from this NOR circuit 39 is sent to the masking unit 1 as an erroneous SCN supervisory range signal, and the output signal e from the AND circuit 32 becomes "0". By this, the signal 34Q from the output terminal Q of the flip-flop 34 continues to be "1". Also, the flip-flop 35 is set at the rising of the clock signal CKP, and the signal 35Q from the output terminal Q thereof becomes "1". Accordingly, at the rising of the next clock signal CKP, the flip-flop 36 is set, and the signal 36Q from the output terminal Q thereof becomes "1". By this, the output signal from the NOR circuit 39 becomes "0".

During a period where the output signal kn from this NOR circuit 39 is "1", the high speed clock signal CKS is sent via the AND circuit 40 as the signal c to the clock terminal CK of the flip-flop 37. Here, if the loop detection signal SCN of "0", which becomes erroneous detection, is given from the circuit (51) right after the restoration of the on-hook transmission signal OHT, the signal 37XQ from the output terminal XQ of the flip-flop 37 becomes "1" as indicated by the hatching, and this "1" is output as the masking signal ms to the masking unit 1.

Also, as to the flip-flop 34 in the masking unit 1, since the output signal e from the AND circuit 32 is "0" during a period where the signal kn is "1", even if the loop detection signal SCN of "0" is sent to the data terminal D, the signal from the output terminal Q continues to be "1". Accordingly, during a period where the output signal kn from the NOR circuit 39 is "1", it becomes the erroneous SCN supervisory range shown in FIG. 13. If the loop detection signal SCN of "0" is sent in that range, as mentioned before, the masking signal ms becomes "1".

When the masking signal ms becomes "1", the counter 42 in the masking time setting unit 3 starts the count of the clock signal CK2. Then, when the signal from the carry-out terminal CO becomes "1", the flip-flop 43 is set at the rising of the next clock signal CK2, and the signal 43XQ from that output terminal XQ thereof becomes "0". By this, the output signal d from the AND circuit 41 in the SCN supervisory unit 2 becomes "0", and the signal 37 XQ from the output terminal XQ of the flip-flop 37 becomes "0". Namely, after an elapse of a time corresponding to the setting in the counter 42 from the rising of the masking signal ms, the reset signal rs is sent to the SCN supervisory unit 2, and the sending of the masking signal ms is suspended. During a masking time indicated by the hatchings of 37XQ and SCN' of FIGS. 13 and 14, the sending of the loop detection signal SCN, which becomes the erroneous detection, is inhibited.

Also, when the output signal kn from the NOR circuit 39 exceeds over the period of "1", that is, the above-described erroneous SCN supervisory range, and the loop detection signal SCN of "0" (loop detection) is sent from the circuit (51), the signal 34Q from the output terminal Q of the flip-flop 34 becomes "0" at the rising of the clock signal CK1. Also, since the output signal c from the AND circuit 40 is "0", the signal 37XQ from the output terminal XQ of the flip-flop 37 becomes "0", and the loop detection signal SCN' of "0" (loop detection) is issued to the scanner via the OR circuit 33.

The present invention is not restricted to the aforementioned embodiments. Various additions and modifications can be made, for example, the invention may be realized by a logical circuit structure corresponding to the logical levels of the signals at the respective portions. Also, the predetermined period serving as the erroneous SCN supervisory range in the third embodiment can be freely set by selecting the rate of the clock signal CKP or the number of stages of the flip-flop etc. Also, the case was shown where the counter or the shift register was used for the setting of the masking time in the masking time setting unit 3, but it is also possible to use another time counting means.

As explained above, according to the present invention, provision is made of a masking unit 1, an SCN supervisory unit 2, and a masking time setting unit 3, so that a loop detection signal SCN from a loop detection circuit 51 produced before the on-hook transmission signal OHT returns from "1" to "0" is judged to be caused by the action of the Subscriber picking up the phone off the hook in response to the ringer, and thus the SCN supervisory unit 2 does not issue the masking signal ms. Accordingly, this signal is sent from the masking unit 1 to the scanner as the loop detection signal SCN'. Also, the loop detection signal produced due to the lack of synchronization between the change of the threshold value in the loop detection circuit and the change of potential of the A-line and the B-line right after the restoration of the on-hook transmission signal OHT is due to erroneous detection. Accordingly, the masking signal ms is sent from the SCN supervisory unit 2 to the masking unit 1, and the issuance of the loop detection signal SCN due to that erroneous detection is prevented. Accordingly, there is the advantage that erroneous loop detection in the on-hook transmission method can be avoided.

Also, when the loop detection signal SCN is sent within a predetermined time (erroneous SCN supervisory range) from the time of restoration of the on-hook transmission signal OHT, the signal is assumed as being due to erroneous detection and the masking signal ms is issued. The loop detection signal SCN is masked by this masking signal ms at the masking unit 1. However, when the loop detection signal SCN is not sent within this predetermined time, the masking signal ms is not issued. Accordingly, there is the advantage that the loop detection signal SCN after the elapse of this predetermined time can be promptly issued to the scanner as a correct loop detection signal by the action of the subscriber picking the phone up off the hook.

Also, the masking time setting unit 3 enables easy setting of the absence of a mask or the presence of a mask and, in the csae of the presence of a mask, the masking time, by the settings to the counter or the shift register. Therefore, the optimum conditions can be set relying on the characteristics of the battery feed circuit, the detection characteristics of the loop detection circuit, etc. Accordingly, there is the advantage that the invention can be realized by an integrated circuit (LSI) and can be used for the subscriber circuits adaptive to various types of exchanges.

I claim:

1. A circuit for issuing a loop detection signal in a subscriber circuit having an on-hook transmission facility for sending a bias voltage to a subscriber line by an on-hook transmission signal in idle intervals of a ringer sent to the subscriber and, at the same time, changing a threshold value of the loop detection at the loop detection circuit and sending information in the form of an AC signal to the aforesaid subscriber, said circuit for issuing a loop detection signal provided with:

a masking unit operative to control whether to send a loop detection signal from the aforesaid loop detection circuit without a mask or to send it masked according to the masking signal as an erroneous detection signal;

a supervisory unit which supervises the loop detection signal from the aforesaid loop detection circuit, sends to the aforesaid masking unit a masking signal which masks the aforesaid loop detection signal appearing right after the restoration of the aforesaid on-hook transmission signal assuming it as an erroneous detection signal and performs control so that the masking signal is not sent with respect to the aforesaid loop detection signal appearing before the restoration of the aforesaid on-hook transmission signal; and a masking time setting unit which is triggered at the rising of the aforesaid masking signal output from said supervisory unit and controls the aforesaid supervisory unit so as to suspend the output of the aforesaid masking signal after an elapse of a set masking time.

2. A circuit for issuing a loop detection signal as set forth in claim 1, wherein the aforesaid supervisory unit has a flip-flop which outputs the aforesaid masking signal by the loop detection signal from the aforesaid loop detection circuit at the time of restoration of the aforesaid on-hook transmission signal and suspends the output of the aforesaid masking signal by a reset signal from the aforesaid masking time setting unit.

3. A circuit for issuing a loop detection signal as set forth in claim 1, wherein the aforesaid supervisory unit supervises the loop detection signal from the aforesaid loop detection circuit in a predetermined time from the time of restoration of the aforesaid on-hook transmission signal and outputs the aforesaid masking signal to the aforesaid masking unit when the aforesaid loop detection signal is given within said predetermined time.

4. A circuit for issuing a loop detection signal as set forth in claim 1, wherein the aforesaid masking time setting unit has a counter which starts the count by the aforesaid masking signal from the aforesaid supervisory unit and enables setting of both the presence or absence of the mask and a masking time from the outside.

5. A circuit for issuing a loop detection signal as set forth in claim 1, wherein the aforesaid masking setting unit has a shift register which starts the shift by the aforesaid masking signal from the aforesaid supervisory unit and enables setting of both the presence or absence of the mask and the masking time by the number of stages of the shift.

6. A circuit for issuing a loop detection signal as set forth in claim 2, wherein the aforesaid masking time setting unit comprises a counter which starts the count by the aforesaid masking signal from the aforesaid supervisory unit and enables setting of both the presence or absence of the mask and the masking time from the outside and a flip-flop which receives as its input the output signal from the carry-out terminal of said counter and outputs the aforesaid reset signal.

7. A circuit for issuing a loop detection signal as set forth in claim 2, wherein the aforesaid masking time setting unit has a shift register which starts the shift by the aforesaid masking signal from the aforesaid supervisory unit and enables setting of both the presence or absence of the mask and the masking time by the number of stages of the shift and a selector which sets the above-described shift stage number of said shift register in accordance with settings from the outside and outputs the aforesaid reset signal from the output terminal of the aforesaid shift register.

8. A circuit for issuing a loop detection signal as set forth in claim 1, wherein the aforesaid masking unit comprises a flip-flop which receives as its input the aforesaid loop detection signal and an OR circuit which receives as its two inputs the output of said flip-flop and the aforesaid masking signal.

9. A circuit for issuing a loop detection signal as set forth in claim 1, wherein the aforesaid masking time setting unit has input terminals for fetching settings designating both the presence or absence of the mask and the masking time when the mask is present from the outside of the loop detection signal issuing circuit.

10. A circuit for issuing a loop detection signal as set forth in claim 3, which is further provided with a plurality of flip-flops for setting the aforesaid predetermined time in the aforesaid supervisory unit and which, when the aforesaid loop detection signal is given within said predetermined time, outputs the aforesaid masking signal right after this.

* * * * *